(12) United States Patent
Chen et al.

(10) Patent No.: US 6,385,603 B1
(45) Date of Patent: May 7, 2002

(54) JOINED TABLE EXPRESSION OPTIMIZATION BY QUERY TRANSFORMATION

(75) Inventors: Yao-Ching Stephen Chen, Saratoga; Fen-Ling Lin, San Jose; Jerry Mukai, San Jose; Hong Tie, San Jose; Yun Wang, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,544

(22) Filed: Jun. 14, 1999

(51) Int. Cl.⁷ .............................................. G06F 17/30
(52) U.S. Cl. ........................ 707/3; 707/2; 707/4; 707/5
(58) Field of Search .................................. 707/2, 3, 4, 5

(56) References Cited

U.S. PATENT DOCUMENTS

| | | | |
|---|---|---|---|
| 4,614,841 A | 9/1986 | Babecki et al. | 379/93.29 |
| 5,057,998 A | 10/1991 | Hirokawa | 709/213 |
| 5,179,665 A | 1/1993 | Roslund et al. | 709/215 |
| 5,418,913 A | 5/1995 | Fujimoto | 709/213 |
| 5,446,841 A | 8/1995 | Kitano et al. | 709/213 |
| 5,584,024 A * | 12/1996 | Shwartz | 707/4 |
| 5,590,324 A | 12/1996 | Leung et al. | 705/5 |
| 5,659,725 A | 8/1997 | Levy et al. | 707/3 |
| 5,713,015 A | 1/1998 | Goel et al. | 707/4 |
| 5,761,422 A | 6/1998 | Westin et al. | 709/213 |
| 5,848,241 A | 12/1998 | Misinai et al. | 709/213 |
| 6,021,405 A * | 2/2000 | Celis et al. | 707/2 |
| 6,112,198 A * | 8/2000 | Lohman et al. | 707/3 |
| 6,275,818 B1 * | 8/2001 | Subramanian et al. | 707/2 |

* cited by examiner

Primary Examiner—Diane D. Mizrahi
(74) Attorney, Agent, or Firm—Gates & Cooper LLP (57) ABSTRACT

A query optimizer analyzes a query and triggers a sequence of transformations to achieve optimal performance for joined table expressions. The transformations include pushing down predicates for joined table expressions and pushing down non-null predicates to simplify join operators for joined table expressions.

15 Claims, 5 Drawing Sheets

JOINED TABLE EXPRESSION OPTIMIZATION BY QUERY TRANSFORMATION

BACKGROUND OF THE INVENTION

1. Field of the Invention

This invention relates in general to database management systems performed by computers, and in particular, to the optimization of joined table expressions by query transformation in database management systems.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

There are a number of well-known and widely-applied optimization methods for queries available in the prior art. Some examples of these optimization methods include Dynamic Programming, Greedy Algorithm, etc. Generally, these optimization methods attempt to find the best execution strategy for a query based on a cost estimation over a range of possible execution strategies in the search space.

On the other hand, optimization has not been successfully applied to joined table expressions. Joined table expressions are found in FROM clauses of SELECT statements, and generally take the form of "table-reference join-operator table-reference ON join-condition." The join-operator can be INNER JOIN, LEFT OUTER JOIN, RIGHT OUTER JOIN or FULL OUTER JOIN, the table-reference represents a base table or intermediate result table, and the join-condition is a boolean expression that results in a true, false, or unknown value. More complex joined table expressions can be a sequence of simple joined table expressions combined by join operators, parentheses, and nested table expressions.

There is a need in the art for improved methods of optimizing joined table expressions and complex join operations. Specifically, there is a need in the art for improved methods of optimizing joined table expressions and complex join operations by query transformations.

SUMMARY OF THE INVENTION

To overcome the limitations in the prior art described above, and to overcome other limitations that will become apparent upon reading and understanding the present specification, the present invention discloses a method, apparatus, and article of manufacture for optimizing queries, wherein the query is analyzed and a sequence of transformations is triggered to achieve the optimal performance for joined table expressions therein. The transformations include predicates push down for joined table expressions and non-null predicates push down to simplify join operators for joined table expressions.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

A query optimization method analyzes a query submitted by a user and triggers a sequence of transformations to achieve the optimal performance for joined table expressions. The transformations include predicates push down for joined table expressions and non-null predicates push down to simplify join operators for joined table expressions.

Hardware Environment

Figure 1:
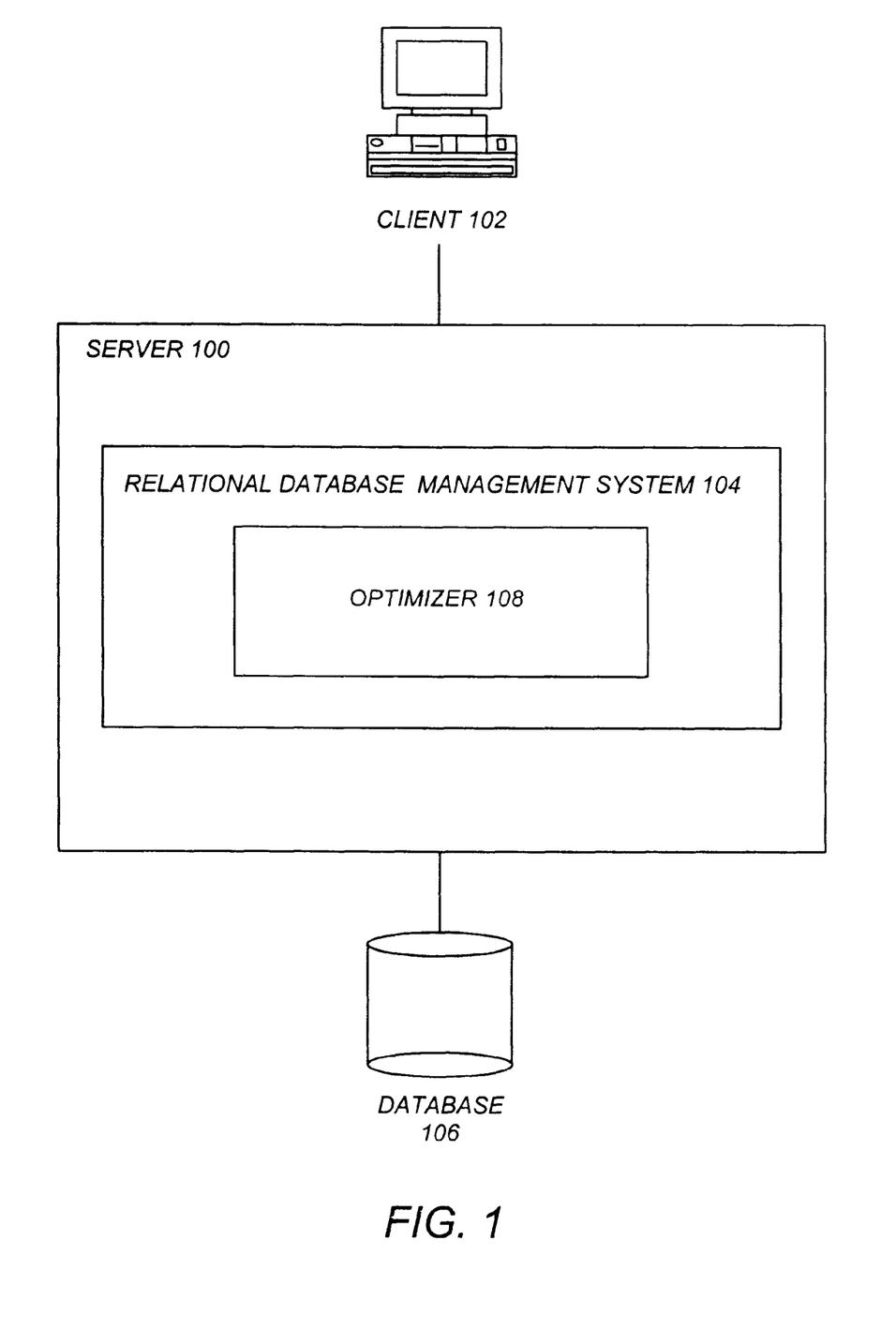
FIG. 1 illustrates an exemplary computer hardware environment that could be used with the preferred embodiment of the present invention.

FIG. 1 is a block diagram illustrating an exemplary hardware environment used to implement the preferred embodiment of the invention. In the exemplary hardware environment, a client/server architecture is illustrated comprising a server computer 100 coupled to a client computer 102. Both the server computer 100 and client computer 102 may include, inter alia, processors, random access memory (RAM), read-only memory (ROM), keyboard, display, fixed and/or removable data storage devices, and data communications devices. Those skilled in the art will recognize that any combination of the above components, or any number of different components, peripherals, and other devices, may be used with the server computer 102 and client computers 102. Those skilled in the art will also recognize that a single computer could be used, rather than multiple computers networked together.

The present invention is typically implemented in a Relational Database Management System (RDBMS) 104, such as the DB2 product sold by IBM Corporation, that manages a relational database 106, although it may be implemented with any database management system. In the example illustrated herein, the RDBMS 104 includes an optimizer 108 that optimizes execution of queries in the RDBMS 104.

The user at the client computer 102 generates commands for performing various search and retrieval functions, termed queries, against the database 106 managed by the RDBMS 104, which may invoke functions of the optimizer 108. In the preferred embodiment, these queries conform to the Structured Query Language (SQL) standard, although other types of queries could also be used without departing from the scope of the invention. The queries invoke functions such as definition, access control, interpretation, compilation, data retrieval, and update of user and system data.

Generally, the RDBMS 104, the SQL queries, and the components thereof, are embodied in or retrievable from a device, medium, or carrier, e.g., a memory, a data storage device, a remote device coupled to the server computer 102 by a data communications device, etc. Moreover, these instructions and/or data, when read, executed, and/or interpreted by the server computer 102, cause the server computer 102 to perform the steps necessary to implement and/or use the present invention.

Thus, the present invention may be implemented as a method, system, or article of manufacture using standard programming and/or engineering techniques to produce software, firmware, hardware, or any combination thereof. The term "article of manufacture" as used herein is intended to encompass instructions and/or logic and/or data embodied in or accessible from any device, carrier, or media.

Of course, those skilled in the art will recognize many modifications may be made to this configuration without departing from the scope of the present invention. In addition, those skilled in the art will recognize that any combination of the above components, or any number of different components, including computer programs, peripherals, and other devices, may be used to implement the present invention, so long as similar functions are performed thereby.

Interactive SQL Execution

Figure 2:
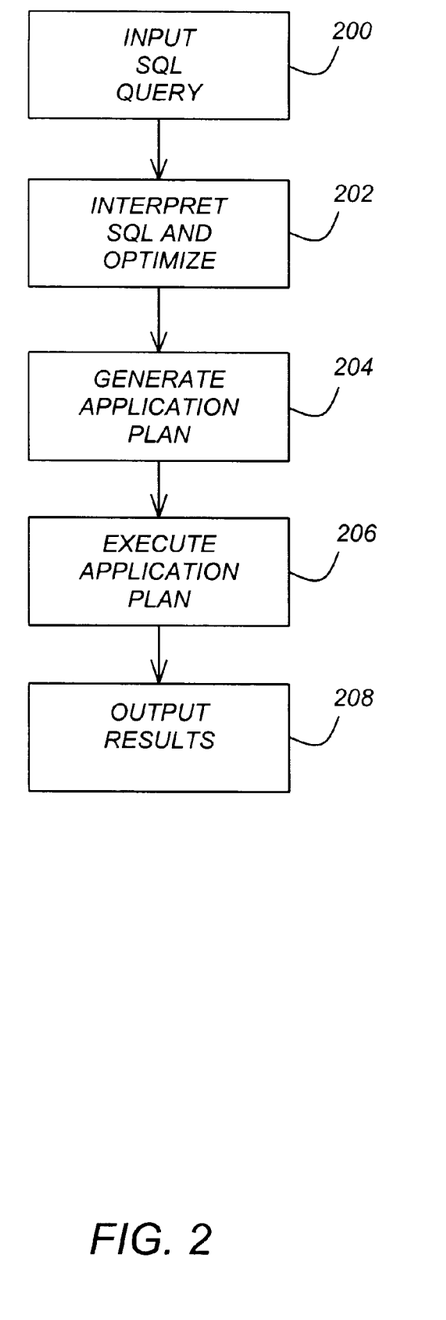
FIG. 2 is a flowchart illustrating the steps necessary for the interpretation and execution of SQL statements in an interactive environment according to the preferred embodiment of the present invention.

FIG. 2 is a flowchart illustrating the steps necessary for the interpretation and execution of SQL statements in an interactive environment according to the preferred embodiment of the present invention. Block 202 represents the input of SQL statements into the computer system 100. Block 204 represents the step of compiling or interpreting the SQL statements. An optimization function within block 204 may transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results.

Embedded/Batch SQL Execution

Figure 3:
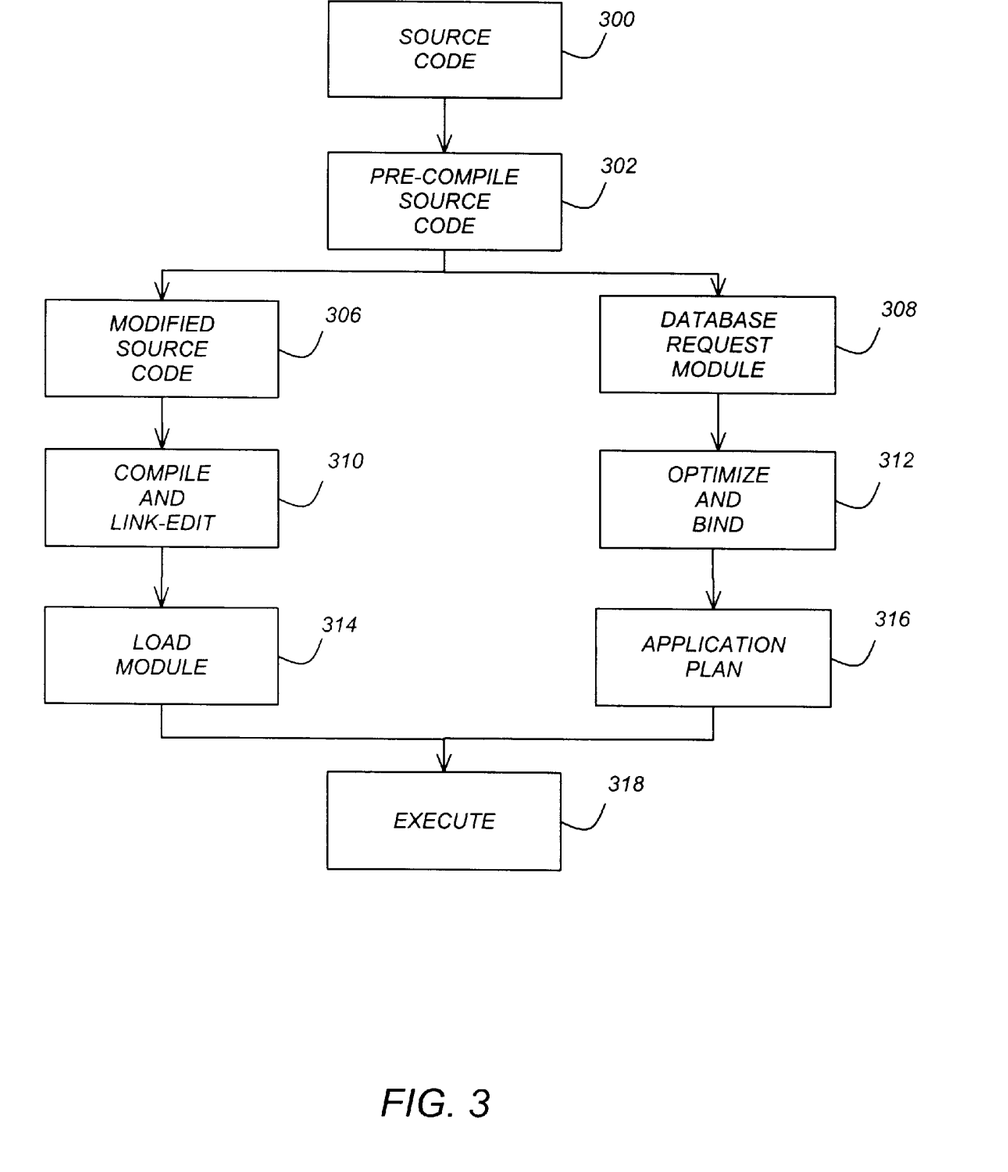
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to the RDBMS 104, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may reorder or optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Description of the Optimization Technique

The present invention discloses an improved optimization technique that is typically performed at step 204 of FIG. 2 or step 314 of FIG. 3. Specifically, the present invention discloses an improved SQL query compilation and optimization technique.

The preferred embodiment of the present invention analyzes a query and triggers a sequence of transformations therein to optimize the performance of joined table expressions. joined table expressions are found in FROM clauses of SELECT statements, and in their simplest form, have the form "table-reference join-operator table-reference ON join-condition." The join-operator can be INNER JOIN, LEFT OUTER JOIN, RIGHT OUTER JOIN or FULL OUTER JOIN, the table-reference represents a base table or intermediate result table, and the join-condition is a boolean expression that results in a true, false, or unknown value. More complex joined table expressions can be a sequence of simple joined table expressions combined by join operators, parentheses, and nested table expressions.

The transformations of joined table expressions performed by the preferred embodiment of the present invention include:

predicate push down for joined table expressions, and not null predicate push down to simplify join operators for joined table expressions.

These transformations are described in more detail below.

Predicate Push Down Transformations for Joined Table Expression Predicate Push Down in a WHERE Clause In a traditional "SELECT . . . FROM . . . WHERE . . . " query, the FROM clause produces a cross product of all the rows from all the tables in the FROM clause, and predicates in the WHERE clause qualify the result of the cross product. In the preferred embodiment of the present invention, predicates in the WHERE clause are evaluated as early as possible to reduce the size of any intermediate results, regardless of whether such an intermediate result needs to be materialized or not.

Consider the following example:

SELECT *
FROM DEPT, EMP
WHERE DEPT.LOC ='stl'
  AND
  DEPT.DNO = EMP.DNO
  AND
  EMP JOB ='Software Engineer';

The DEPT.LOC='stl' predicate is evaluated when DEPT is accessed, the DEPT.DNO=EMP.DNO predicate is evaluated when EMP is joined, and the EMP.JOB='Software Engineer' predicate is evaluated when EMP is accessed.

The FROM clause has been extended to include simple tables and views, table expressions as derived tables, and joined table expressions (all of which are known as table references). A predicate in the WHERE clause can reference multiple table references in a FROM clause and a predicate will filter out rows not needed by the query.

The ON clause replaces the cross product semantics of the FROM clause when concatenated rows are constructed by the joined table expression. The predicates in the WHERE clause will qualify the query result by filtering out results which are not needed.

The rationale for this transformation is the same as the rationale for applying each predicate as early as possible to reduce the size of each intermediate result. When a predicate references only tables in a single joined table expression, such a predicate should be pushed inside the joined table expression for optimal performance. However, the syntax of a joined table expression does not provide a location for direct placement of the predicates; only a nested table expression provides for the placement of predicates, i.e., within a WHERE clause.

Consider the following simple example:
SELECT *
FROM DEPT LEFT JOIN EMP
  ON DEPT-DNO = EMP.DNO,
  PROJ
WHERE DEPT.DNO = PROJ.DNO
  AND (DEPT.LOC < > EMP.LOC OR EMP.DNO IS NULL);

It is desirable that the predicate (DEPT.LOC < > EMP.LOC OR EMP.DNO IS NULL) in the WHERE clause be checked immediately after the DEPT LEFT JOIN EMP is performed. For example, a query transformation or rewrite of the following form may be used:
SELECT *
FROM (SELECT *
  FROM DEPT LEFT JOIN EMP
    ON DEPT.DNO = EMP.DNO
  WHERE DEPT.LOC < > EMP.LOC OR EMP.DNO IS NULL)
AS DEPTEMP, PROJ
WHERE DEPTEMP.DNO = PROJ.DNO;

Predicates on the Preserved Side

When such a push down predicate is on a preserved side of a joined table expression, the predicate can be further pushed down (i.e., pushed inside) as follows:
SELECT *
FROM DEPT LEFT JOIN EMP
  ON DEPT.DNO = EMP.DNO
WHERE DEPT.LOC ='SJ';
The first step of the transformation will be:
SELECT *
FROM (SELECT *
  FROM DEPT LEFT JOIN EMP
    ON DEPT.DNO = EMP.DNO
  WHERE DEPT.LOC ='SJ')
AS DEPTEMP;
The next step of the transformation will be:
SELECT *
FROM (SELECT *
  FROM (SELECT *
    FROM DEPT
    WHERE DEPT.LOC ='SJ')
  AS DEPT LEFT JOIN EMP
    ON DEPT.DNO = EMP.DNO)
AS DEPTEMP;

Predicates on the Null Supplying Side

When such a push down predicate is on a null supplying side of a joined table expression, the predicate can be further pushed down (i.e., pushed inside) as follows:
SELECT *
FROM DEPT LEFT JOIN EMP
  ON DEPT.DNO = EMP.DNO
WHERE EMP.LOC ='SJ'
  OR
  EMP.LOC IS NULL;
The first step of the transformation will be:
SELECT *
FROM (SELECT *
  FROM DEPT LEFT JOIN EMP
    ON DEPT.DNO = EMP.DNO
  WHERE EMP.LOC ='SJ'OR EMP.LOC IS NULL)
AS DEPTEMP;
After the predicate has been pushed inside the joined table expression, the predicate cannot be pushed down deeper into the query when it references only the tables in the null supplying side.

However, predicates on the null supplying side may enable further join type reduction. Consider, the following example:
SELECT *
FROM DEPT LEFT JOIN EMP
  ON DEPT.DNO = EMP.DNO
WHERE EMP.LOC ='SJ';
The first step of the transformation will be:
SELECT *
FROM (SELECT *
  FROM DEPT LEFT JOIN EMP
    ON DEPT.DNO = EMP.DNO
  WHERE EMP.LOC ='SJ')
AS DEPTEMP;
The next step of the transformation will be:
SELECT *
FROM (SELECT *
  FROM DEPT, EMP
  WHERE DEPT.DNO = EMP.DNO AND EMP.LOC ='SJ')
AS DEPTEMP;
The next step of the transformation may be:
SELECT *
FROM DEPT, EMP
WHERE DEPT.DNO = EMP.DNO AND EMP.LOC = 'SJ';

Predicates in a WHERE Clause

A predicate in a WHERE clause can be an arbitrary predicate on any number of tables, which can be actually either inner joined or outer joined in the joined table expression. Consider the following example:
SELECT *
FROM DEPT INNER JOIN EMP
  ON DEPT.DNO = EMP.DNO
  LEFT JOIN OFFICE
  ON DEPT.DNO = OFFICE.DNO
WHERE DEPT.MGR = EMP.MGR;
In the above example, DEPT and EMP are inner joined in the joined table expression. Alternatively, consider the following example:
SELECT *
FROM DEPT LEFT JOIN EMP

```
ON DEPT.DNO = EMP.DNO
LEFT JOIN OFFICE
ON DEPT.DNO = OFFICE.DNO
WHERE EMP.DNO IS NULL OR DEPT.LOC < >
   EMP.LOC
```
In the above example, DEPT and EMP are outer joined in the joined table expression.

Predicate Push Down in an ON Clause

The ON clause of any outer join can reference predicates on the preserved side only, on the null supplying side only, and on both the preserved side and the null supplying side.

Consider the following example:
```
SELECT *
FROM DEPT LEFT JOIN EMP
   ON DEPT.LOC ='STL' AND
   DEPT.LOC = EMP.LOC AND
   EMP.JOB ='Software Engineer';
```
A predicate that references the preserved side only has to be checked when the outer join is performed and before the null supplying table is accessed. A predicate that references the null supplying side only can be pushed down in the query to the null supplying side, if necessary, in a manner similar to the predicate in the WHERE clause. The same procedure for pushing down the predicates in the WHERE clause will also apply:
```
SELECT *
FROM DEPT LEFT JOIN
   (EMP LEFT JOIN PROJ
   ON EMP.ENO = PROJ.ENO)
   ON DEPT.DNO = EMP.DNO AND EMP.LOC ='SJ';
```
The ON predicate over the null supplying side can be pushed down to the next level of the query as a predicate in the WHERE clause.

Consider the following query transformation:
```
SELECT *
FROM DEPT LEFT JOIN
   (SELECT *
   FROM EMP LEFT JOIN PROJ
     ON EMP.ENO = PROJ.ENO
   WHERE EMP.LOC ='SJ')
   AS EMPPROJ ON DEPT.DNO = EMPPROJ.DNO;
```
A next step of the transformation will be as follows:
```
SELECT *
FROM DEPT LEFT JOIN
   (SELECT *
   FROM (SELECT
     FROM EMP
     WHERE LOC='SJ')
   AS EMP LEFT JOIN PROJ ON EMP.ENO = PRO-
     J.ENO
   AS EMPPROJ
   ON DEPT.DNO = EMPPROJ.DNO;
```
The same procedure applies for the following case as well:
```
SELECT *
FROM DEPT LEFT JOIN
   (EMP LEFT JOIN PROJ
   ON EMP.ENO = PROJ.ENO)
   ON DEPT.DNO = EMP.DNO AND PROJ.LOC='SJ';
```
The above example provides a push down for join reduction and restrictive predicate.

Not Null Predicates Push Down

Join type reductions are determined according to how an outer join result is used in the following operations, which can be joins or even subquery references. Typically, an outer join produces rows with some null padded columns. When the result of the outer join is used in a following operation that restricts or eliminates those rows with null padded columns, then the outer join can be reduced or simplified. Typically, a null intolerant predicate is the key factor to restrict the null padded rows from the outer join.

Not Null Predicates in a WHERE Clause

The predicates in the WHERE clause are a very common source for null intolerant predicates for outer join operations in joined table expression. Consider the following example:
```
SELECT *
FROM DEPT LEFT JOIN EMP
   ON DEPT.DNO = EMP.DNO,
   PROJ
WHERE DEPT.DNO = PROJ.DNO AND
   EMP.JOB ='Software Engineer';
```
In accordance with discussion concerning predicate push down in the previous section, the predicate of EMP.JOB= 'Software Engineer' can be pushed inside the LEFT JOIN joined table expression. This transformation results in the following:
```
SELECT *
FROM (SELECT *
   FROM DEPT LEFT JOIN EMP
     ON DEPT.DNO = EMP.DNO
   WHERE EMP.JOB='Software Engineer')
   AS DEPTEMP,
   PROJ
WHERE DEPTEMP.DNO = PROJ.DNO;
```
It becomes obvious that the LEFT OUTER JOIN can be simplified to an INNER JOIN, because its immediate result will be qualified by the predicate of EMP.JOB = 'Software Engineer', which also implies EMP.JOB IS NOT NULL. Therefore, the query can be further transformed as follows:
```
SELECT *
FROM (SELECT *
   FROM DEPT INNER JOIN EMP
     ON DEPT.DNO = EMP.DNO AND
     EMP.JOB='Software Engineer')
   AS DEPTEMP, PROJ
WHERE DEPTEMP.DNO = PROJ.DNO;
```
The query can further be transformed to the following:
```
SELECT *
FROM DEPT, EMP, PROJ
WHERE DEPT.DNO = EMP.DNO AND
   EMP.JOB='Software Engineer' AND
   DEPT.DNO = PROJ.DNO;
```
The NOT NULL predicate can be a join predicate, as indicated in the following:
```
SELECT *
FROM DEPT LEFT JOIN EMP
   ON DEPT.DNO = EMP.DNO, OFFICE
WHERE EMP.JOB ='Software Engineer' AND
   EMP.ENO = OFFICE.ENO;
```
Moreover, the NOT NULL predicate can be a complicated predicate. Consider the following example:

---

```
SELECT *
FROM TX, (T1 LEFT JOIN T2
     ON                left join (2)
     LEFT JOIN         left join (1)
```

-continued

```
            T3 LEFT JOIN T4    left join (3)
    ON
            ON
        WHERE T1.C1 + T2.C1 +
    T3.C1 + T4.C1 = TX.C1;
```

The complex predicate of T1.C1+T2.C1+T3.C1+T4.C1= TX.C1 includes predicates of T1.C1 IS NOT NULL, T2.C1 IS NOT NULL, ..., for the purposes of join type reduction. In this example, the entire predicate cannot be pushed down to the joined table expression, but the implicit IS NOT NULL predicates can be pushed down to the joined table expression:

- for left join (1), the implicit predicate of T1.C1 IS NOT NULL and T2.C1 IS NOT NULL can be further pushed down to the preserved side, the implicit predicate of T3.C1 IS NOT NULL or T4.C1 IS NOT NULL will reduce the join type to an inner join, and both predicates can be further pushed down to the original null supplying side.
- for left join (2), the implicit predicate of T2.C1 IS NOT NULL will reduce the join type to an inner join.
- for left join (3), the implicit predicate of T4.C1 IS NOT NULL will reduce the join type to an inner join.

Accordingly, the original query will be transformed to the following:

SELECT *
FROM TX, T1, T2, T3, T4
WHERE ... AND T1.C1+T2.C1+T3.C1+T4.C1=TX.C1;

However, not every predicate in a WHERE clause includes the IS NOT NULL property for the join type reduction. Consider the following examples:

SELECT *
FROM DEPT LEFT JOIN EMP
    ON DEPT.DNO = EMP.DNO
WHERE EMP.DNO IS NULL OR DEPT.LOC < >EMP.LOC;
SELECT *
FROM DEPT LEFT JOIN EMP
    ON DEPT.DNO = EMP.DNO
WHERE DEPT.LOC ='SJ' OR EMP.LOC ='SJ';

Not Null Predicates in an ON Clause

The ON clause predicate can be restrictive for its null supplying side. Consider the following example:

SELECT *
FROM TX, (T1 LEFT JOIN T2 ON ... left join (2)
    LEFT JOIN left join (1)
    (T3 LEFT JOIN T4 ON ... ) left join (3)
    ON T1.C1=1
    AND
    T2.C1=1
    AND
    T3.C1=1
    AND
    T4.C1=1
    AND
    T1.C1+T2.C1+T3.C1+T4.C1=0;

The following can be said about the above example:

- T1.C1=1 and T2.C1=1 reference only the preserved side of left join (1), so they can not be pushed down to reduce any join type.
- T3.C1=1 references the null supplying side of left join (1), so it can be pushed down to left join (3) as a predicate in the WHERE clause, but it will not reduce the join type, because it restricts only the preserved side of left join (3).
- T4.C1=1 references the null supplying side of left join (1), so it can be pushed down to left join (3) as a where predicate, and it will reduce the join type of left join (3), because it restricts null values from the null supplying side of left join (3).
- T1.C1+T2.C1+T3.C1+T4.C1=0 has the same property as the above predicates through its implicit T1.C1 IS NOT NULL, T2.C1 IS NOT NULL, T3.C1 IS NOT NULL and T4.C1 IS NOT NULL, and the join type of left join (3) will be reduced by T4.C1 IS NOT NULL.

Logic of the Optimization Technique

Figure 4A:
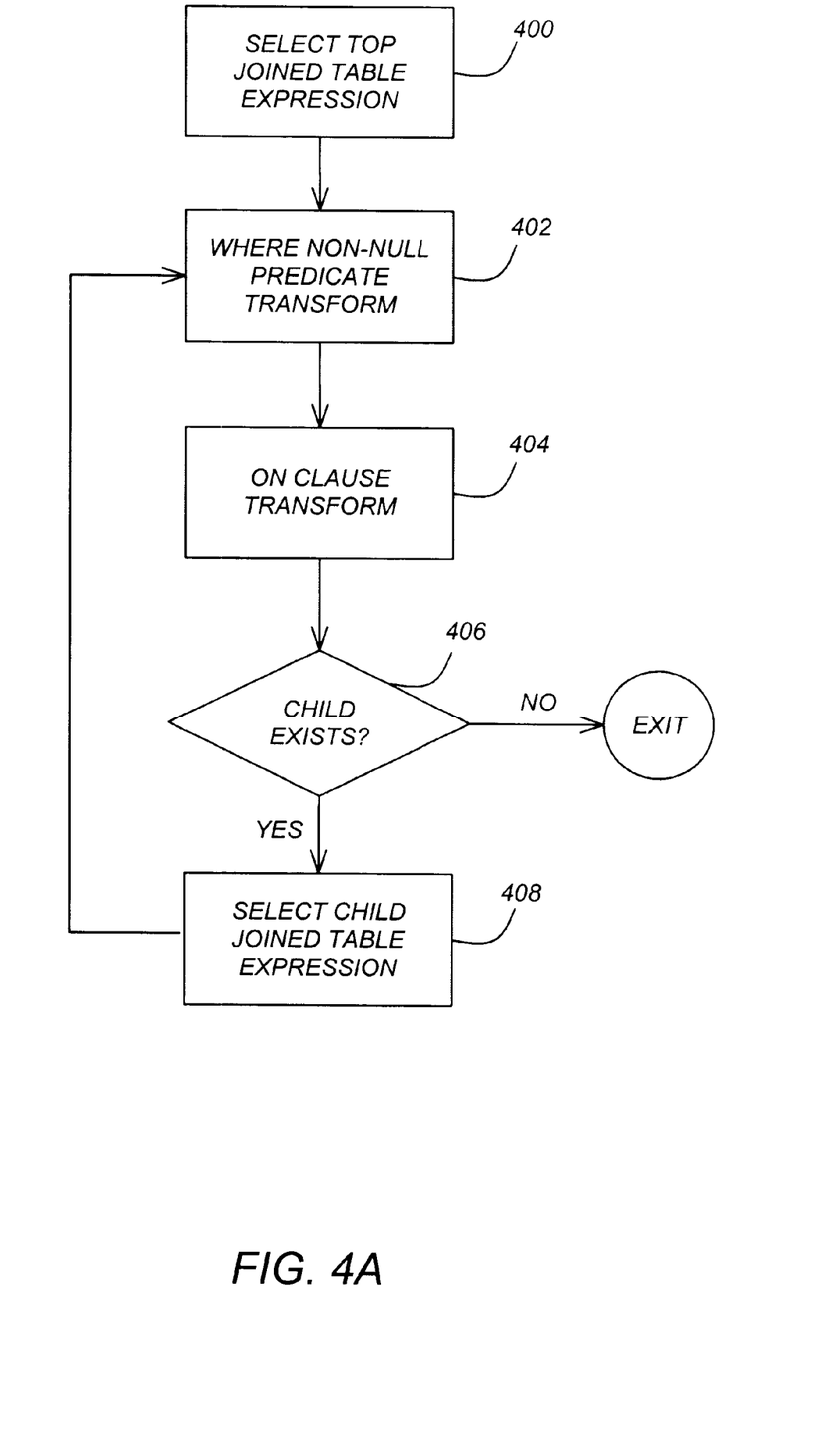
FIGS. 4A and 4B are flowcharts that illustrate methods of optimizing SQL queries according to the preferred embodiment of the present invention.
Figure 4B:
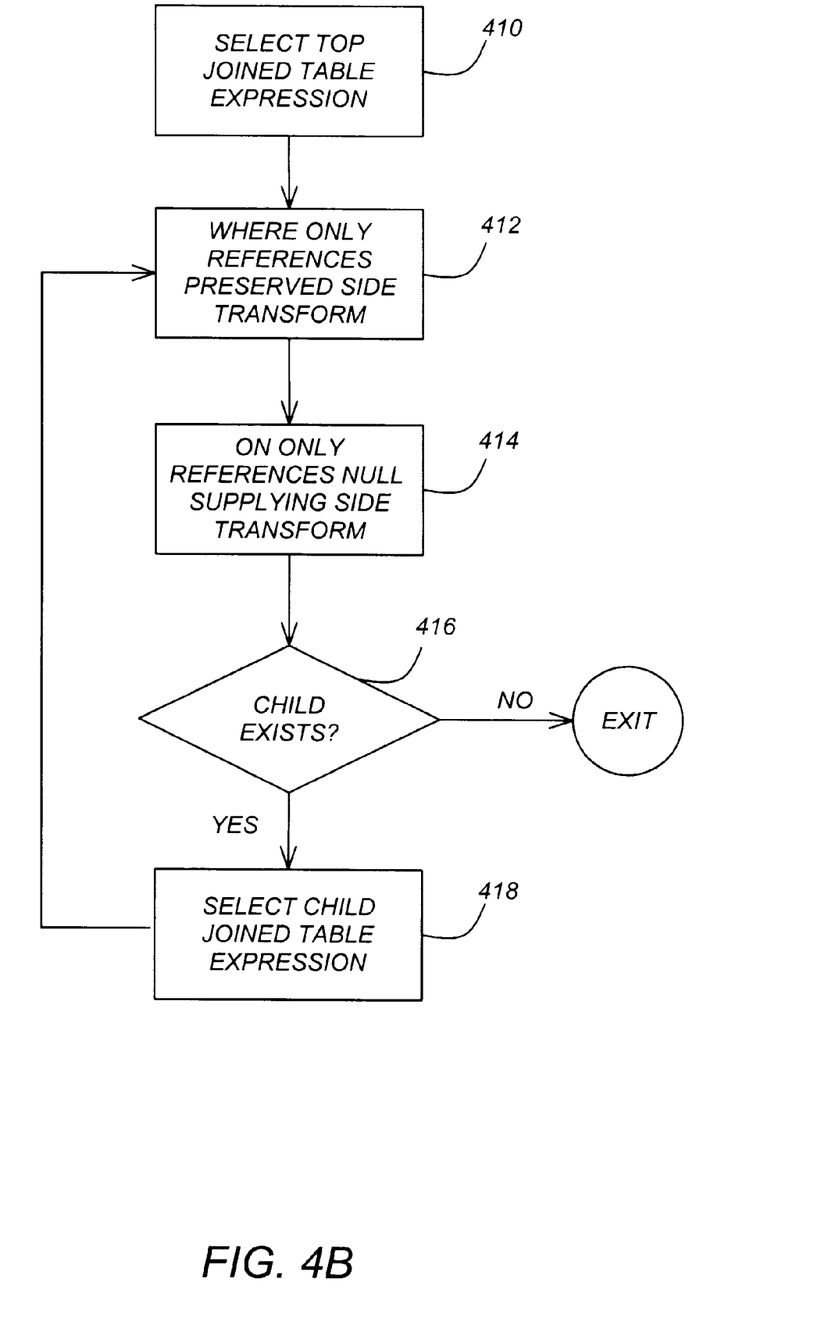

FIGS. 4A and 4B are flowcharts illustrating the methods of optimizing SQL queries in step 204 of FIG. 2 and step 314 of FIG. 3 according to the preferred embodiment of the present invention. Note that the term "query" as referred to herein is intended to cover any access to data, including updates, deletes, and inserts, as well as the simple retrieval of data.

FIG. 4A describes the logic for simplifying joins within a joined table expression.

Block 400 represents the optimizer 108 selecting a top level joined table expression within a query.

Block 402 represents the optimizer 108 transforming a join in the situation where a non-null predicate from the WHERE clause references the null-supplying side of the joined table expression.

Block 404 represents the optimizer 108 transforming a join in the situation where an ON clause from a parent joined table expression references a null supplying side of a child joined table expression.

Block 406 is a decision block that represents the optimizer 108 determining whether a child joined table expression exists in the query. If so, control transfers to Block 402; otherwise, the logic terminates.

Block 408 represents the optimizer 108 selecting a child joined table expression within the query.

FIG. 4B describes the logic for pushing down predicates within a query.

Block 410 represents the optimizer 108 selecting a top level joined table expression within a query.

Block 412 represents the optimizer 108 pushing down predicates to a child joined table expression in the situation where predicate from the WHERE clause references the preserved side of the child joined table expression.

Block 414 represents the optimizer 108 pushing down predicates to a child joined table expression in the situation where an ON clause references a null supplying side of the child joined table expression.

Block 416 is a decision block that represents the optimizer 108 determining whether a child joined table expression exists in the query. If so, control transfers to Block 412; otherwise, the logic terminates.

Block 418 represents the optimizer 108 selecting a child joined table expression within the query.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program, including other RDBMS or DBMS programs, could benefit from the present invention.

In summary, the present invention discloses a method, apparatus, and article of manufacture for optimizing queries, wherein the query is analyzed and a sequence of one or more transformations is triggered to achieve the optimal performance for joined table expressions therein. The transformations include predicates push down for joined table expressions and non-null predicates push down to simplify join operators for joined table expressions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a relational database management system, comprising:
   (a) analyzing the query to determine whether it contains at least one joined table expression; and
   (b) transforming the joined table expressions by simplifying joins within the joined table expressions;
   (c) wherein the transforming step comprises transforming a join when a non-null predicate from a WHERE clause references a null-supplying side of the joined table expression.

2. A method of optimizing a query in a relational database management system, comprising:
   (a) analyzing the query to determine whether it contains at least one joined table expression; and
   (b) transforming the joined table expressions by simplifying joins within the joined table expressions;
   (c) wherein the transforming step comprises transforming a join when an ON clause from a parent joined table expression references a null supplying side of a child joined table expression.

3. A method of optimizing a query in a relational database management system, comprising:
   (a) analyzing the query to determine whether it contains at least one joined table expression; and
   (b) transforming the joined table expressions by pushing down predicates within the query.

4. The method of claim 3, wherein the transforming step comprises pushing down predicates from the joined table expression to a child joined table expression when a predicate from a WHERE clause references a preserved side of the child joined table expression.

5. The method of claim 3, wherein the transforming step comprises pushing down predicates from the joined table expression to a child joined table expression an ON clause references a null supplying side of the child joined table expression.

6. An apparatus for optimizing a query in a relational database management system, comprising:
   (a) a computer system having a data storage device coupled thereto for storing a database;
   (b) means, performed by the computer system, for analyzing the query to determine whether it contains at least one joined table expression; and
   (c) means, performed by the computer system, for transforming the joined table expressions by simplifying at least one join within the joined table expressions;
   (d) wherein the means for transforming comprises means for transforming a join when a non-null predicate from a WHERE clause references a null-supplying side of the joined table expression.

7. An apparatus for optimizing a query in a relational database management system, comprising:
   (a) a computer system having a data storage device coupled thereto for storing a database;
   (b) means, performed by the computer system, for analyzing the query to determine whether it contains at least one joined table expression; and
   (c) means, performed by the computer system, for transforming the joined table expressions by simplifying at least one join within the joined table expressions;
   (d) wherein the means for transforming comprises transforming a join when an ON clause from a parent joined table expression references a null supplying side of a child joined table expression.

8. An apparatus for optimizing a query in a relational database management system, comprising:
   (a) a computer system having a data storage device coupled thereto for storing a database;
   (b) means, performed by the computer system, for analyzing the query to determine whether it contains at least one joined table expression; and
   (c) means, performed by the computer system, for transforming the joined table expressions by pushing down predicates within the query.

9. The apparatus of claim 8, wherein the means for transforming comprises means for pushing down predicates from the joined table expression to a child joined table expression when a predicate from a WHERE clause references a preserved side of the child joined table expression.

10. The apparatus of claim 8, wherein the means for transforming comprises means for pushing down predicates from the joined table expression to a child joined table expression an ON clause references a null supplying side of the child joined table expression.

11. An article of manufacture embodying logic for performing a method of optimizing a query in a relational database management system, the method comprising:
   (a) analyzing the query to determine whether it contains at least one joined table expression; and
   (b) transforming the joined table expressions by simplifying joins within the joined table expressions;
   (c) wherein the transforming step comprises transforming a join when a non-null predicate from a WHERE clause references a null-supplying side of the joined table expression.

12. An article of manufacture embodying logic for performing a method of optimizing a query in a relational database management system, the method comprising:
   (a) analyzing the query to determine whether it contains at least one joined table expression; and
   (b) transforming the joined table expressions by simplifying joins within the joined table expressions;
   (c) wherein the transforming step comprises transforming a join when an ON clause from a parent joined table expression references a null supplying side of a child joined table expression.

13. An article of manufacture embodying logic for performing a method of optimizing a query in a relational database management system, the method comprising:
   (a) analyzing the query to determine whether it contains at least one joined table expression; and (b) transforming the joined table expressions by pushing down predicates within the query.

14. The method of claim 13, wherein the transforming step comprises pushing down predicates from the joined table expression to a child joined table expression when a predicate from a WHERE clause references a preserved side of the child joined table expression.

15. The method of claim 13, wherein the transforming step comprises pushing down predicates from the joined table expression to a child joined table expression an ON clause references a null supplying side of the child joined table expression.

* * * * *

UNITED STATES PATENT AND TRADEMARK OFFICE
CERTIFICATE OF CORRECTION

PATENT NO. : 6,385,603 B1
DATED : May 7, 2002
INVENTOR(S) : Yao-Ching Stephen Chen et al.

It is certified that error appears in the above-identified patent and that said Letters Patent is hereby corrected as shown below:

<u>Title page,</u>
Item [56], References Cited, please insert the following:
-- OTHER PUBLICATIONS
IBM Technical Data Bulletin No. TDB0989,0289, September 1998, SPI: Software Patent Institute Database of Software Technologies – Record Display, "Adaptive Path Selection for Query With Input Variables", pp. 1-4. --

Signed and Sealed this

Twenty-second Day of April, 2003

JAMES E. ROGAN
*Director of the United States Patent and Trademark Office*